(12) United States Patent
Fujino et al.

(10) Patent No.: US 11,411,633 B2
(45) Date of Patent: Aug. 9, 2022

(54) TRANSMISSION DEVICE, WIRELESS COMMUNICATION SYSTEM, AND TRANSMISSION METHOD

(71) Applicant: NIPPON TELEGRAPH AND TELEPHONE CORPORATION, Tokyo (JP)

(72) Inventors: Yosuke Fujino, Yokosuka (JP); Hiroyuki Fukumoto, Yokosuka (JP); Hajime Katsuda, Yokosuka (JP); Kazunori Akabane, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 94 days.

(21) Appl. No.: 16/965,959

(22) PCT Filed: Feb. 1, 2019

(86) PCT No.: PCT/JP2019/003625
§ 371 (c)(1),
(2) Date: Jul. 29, 2020

(87) PCT Pub. No.: WO2019/151480
PCT Pub. Date: Aug. 8, 2019

(65) Prior Publication Data
US 2021/0119685 A1    Apr. 22, 2021

(30) Foreign Application Priority Data

Feb. 1, 2018  (JP) .............................. JP2018-016635

(51) Int. Cl.
*H04B 7/02*    (2018.01)
*H04L 1/02*    (2006.01)
(Continued)

(52) U.S. Cl.
CPC ......... *H04B 7/0671* (2013.01); *H04B 1/0082* (2013.01); *H04B 2001/6912* (2013.01)

(58) Field of Classification Search
CPC ................ H04B 7/0671; H04B 1/0082; H04B 2001/6912; H04B 1/69; H04B 7/0615; H04B 7/0667; H04B 7/0413
(Continued)

(56) References Cited

U.S. PATENT DOCUMENTS 5,430,711 A    7/1995 Yamada et al.
6,515,622 B1 *  2/2003 Izadpanah ................ H01Q 3/36
                                                       342/368
(Continued)

FOREIGN PATENT DOCUMENTS

EP    1001558 A2    5/2000
EP    1458114 A2    9/2004
(Continued)

OTHER PUBLICATIONS

Fujino, Yosuke et al., "Cell Range Extension Techniques for Wide-Area Ubiquitous Network", Autonomous Decentralized Systems (ISADS), 2011 10th International Symposium on IEEE, Mar. 23, 2011. pp. 35-40, XP031936912, DOI: 10.1109/ISADS.2011.11 ISBN: 978-1-61284-213-4.
(Continued)

*Primary Examiner* — Tanmay K Shah
(74) *Attorney, Agent, or Firm* — Harness, Dickey & Pierce, P.L.C.

(57) ABSTRACT

A transmission device includes a modulation unit that performs chirp-spread modulation on an input information series to generate a modulation signal; a delay unit that provides, to a plurality of modulation signals obtained by duplicating the modulation signal generated by the modulation unit, delays having lengths different from each other,
(Continued)

a difference between the delays being an integral multiple of a reciprocal of a bandwidth of the modulation signal; and a plurality of transmission antennas that transmit the plurality of modulation signals, respectively, to which the delays are provided by the delay unit.

12 Claims, 7 Drawing Sheets

(51) Int. Cl.
*H04B 7/06* (2006.01)
*H04B 1/00* (2006.01)
*H04B 1/69* (2011.01)

(58) Field of Classification Search
USPC ........................................... 375/267
See application file for complete search history.

(56) References Cited

U.S. PATENT DOCUMENTS

| 2001/0004357 | A1 | 6/2001 | Fuke et al. |
| 2006/0280227 | A1* | 12/2006 | Pinkney .................. H04B 1/69 375/139 |
| 2011/0039588 | A1 | 2/2011 | Fujino et al. |
| 2012/0326781 | A1 | 12/2012 | Mori et al. |
| 2019/0004138 | A1* | 1/2019 | Hafenecker ............. G01S 1/042 |

FOREIGN PATENT DOCUMENTS

| JP | H03135238 A | 6/1991 |
| JP | H06318923 A | 11/1994 |
| JP | 2000151465 A | 5/2000 |
| JP | 2001036442 A | 2/2001 |
| JP | 2003264470 A | 9/2003 |
| JP | 2007325079 A | 12/2007 |
| JP | 2008060685 A | 3/2008 |
| JP | 2008153762 A | 7/2008 |
| KR | 1020100122117 A | 11/2010 |
| WO | WO-2011108103 A1 | 9/2011 |

OTHER PUBLICATIONS

Fujino, Yosuke, Uchida, Daisei, Fujita, Takafumi, Kagami, Osamu, Watanabe, Kazuji, "A Low Complexity Frequency Offset Transmitter Diversity Scheme for Wide Area Ubiquitous Network", Proceedings of the 2007 IEICE Society Conference (1), Aug. 29, 2007, p. 449.

International Search Report (In English and Japanese) issued in PCT/JP2019/003625, dated Mar. 12, 2019.

* cited by examiner

TRANSMISSION DEVICE, WIRELESS COMMUNICATION SYSTEM, AND TRANSMISSION METHOD

CROSS-REFERENCE TO RELATED APPLICATIONS

This application is a 371 National Stage of International Application No. PCT/JP2019/003625, filed on Feb. 1, 2019, which claims priority to Japanese Application No. 2018-016635, filed on Feb. 1, 2018. The entire disclosures of the above applications are incorporated herein by reference.

TECHNICAL FIELD

The present invention relates to a transmission device, a wireless communication system, and a transmission method.

BACKGROUND ART

In wireless communication, fading in which a reception level fluctuates due to multiple wave propagation occurs, and transmission quality greatly deteriorates due to a drop in a reception level. As a technique for reducing deterioration of the transmission quality due to the drop in the reception level, a diversity technique using two or more paths having a low correlation between reception level fluctuations is known.

The diversity technique is broadly divided into time diversity and space diversity. The time diversity is, for example, a general term for a diversity technique that uses two or more temporally separated paths as in a technique of transmitting the same signal at different timings and selecting a signal at a high level. On the other hand, the space diversity is, for example, a general term for a diversity technique that uses two or more spatially separated paths as in a technique of preparing two or more antennas and selecting an antenna at the highest level. Here, in the former time diversity, in a case where a period of the level fluctuation is long, that is, in a case where a moving speed of a terminal is slow, a correlation between temporally separated paths becomes high, and a diversity effect is reduced. Therefore, in order to perform high-quality transmission with a wireless terminal under various situations, it is essential to apply the space diversity.

In a transmission diversity realized using a plurality of transmission antennas in the space diversity, it is difficult to estimate channel responses (amplitude/phase responses from the transmission antennas to reception antennas) on a transmission side. Therefore, a method is required which does not require channel information on the transmission side. As one of the diversity techniques that does not require the channel information on the transmission side, for example, there is a frequency offset transmission diversity method as disclosed in Patent Literature 1.

FIG. 13 is a block diagram representing a configuration of a wireless communication system 90 disclosed in Patent Literature 1. As represented in FIG. 13, the wireless communication system 90 includes a transmission device 70 having two transmission antennas 76 (76-1 and 76-2) and a reception device 80. In general, in a frequency offset transmission diversity method, the transmission device 70 provides different frequency offsets to the transmission antennas 76-1 and 76-2 using frequency offset-providing means 74-1 and 74-2, respectively, and transmit signals to the reception device 80. In a case where the transmission device 70 transmits a plurality of signals to which different frequency offsets are provided, the reception level fluctuates on the reception side due to a frequency difference between the signals. Therefore, it is possible to avoid a constant drop in the reception level.

In the wireless communication system 90 disclosed in Patent Literature 1, the reception level fluctuation is further forcibly generated. Due to the reception level fluctuation, a reception quality of information series obtained after demodulation varies. Therefore, the wireless communication system 90 randomizes the variation in the reception quality of the information series obtained after demodulation due to the reception level fluctuation using the interleaver 72 of the transmission device 70 and the deinterleaver 85 of the reception device 80. The wireless communication system 90 obtains a diversity effect by relieving a random error due to the variation in reception quality using an error correction code.

CITATION LIST

Patent Literature

[Patent Literature 1]
Japanese Unexamined Patent Application, First Publication No. Hei 03-135238
[Patent Literature 2] Japanese Unexamined Patent Application, First Publication No. 2007-325079 A
[Patent Literature 3]
Japanese Unexamined Patent Application, First Publication No. 2008-153762 A

SUMMARY OF INVENTION

Technical Problem

The above-described reception device 80 in the wireless communication system 90 disclosed in Patent Literature 1 needs to have a configuration including the deinterleaver 85 and the error correction code-decoding means 86 in addition to a configuration of a reception device including the simplest wireless communication system having only a modulation/demodulation function.

In addition, as a related-art technique for obtaining the transmission diversity effect using the plurality of transmission antennas, there are wireless communication systems described in Patent Literature 2 and Patent Literature 3. However, even in the wireless communication system disclosed in Patent Literature 2, the reception device needs to have a configuration including the deinterleaver and the error correction code-decoding means. In addition, in the wireless communication system disclosed in Patent Literature 3, the deinterleaver is not necessary but the reception device needs to have a configuration of the error correction code-decoding means.

As described above, in the related art, it is necessary to use a special reception device that is supposed to apply the transmission diversity.

The present invention has been made in view of such circumstances, and an object of the present invention is to provide a transmission device, a wireless communication system, and a transmission method which are capable of obtaining a diversity effect even in communication with respect to a general reception device that is not supposed to apply frequency offset diversity.

Solution to Problem

A transmission device according to a first aspect of the present invention includes: a modulation unit that performs chirp-spread modulation on an input information series to generate a modulation signal; a delay unit that provides, to a plurality of modulation signals obtained by duplicating the modulation signal generated by the modulation unit, delays having lengths different from each other, a difference between the delays being an integral multiple of a reciprocal of a bandwidth of the modulation signal; and a plurality of transmission antennas that transmit the plurality of modulation signals, respectively, to which the delays are provided by the delay unit.

According to a second aspect of the present invention, in the transmission device according to the first aspect, the delay unit provides the delays to digital signals representing the plurality of modulation signals.

According to a third aspect of the present invention, in the transmission device according to the first aspect, the delay unit provides the delays to analog signals representing the plurality of modulation signals.

A wireless communication system according to a fourth aspect of the present invention includes a transmission device and a reception device. The transmission device includes: a modulation unit that performs chirp-spread modulation on an input information series to generate a modulation signal; a delay unit that provides, to a plurality of modulation signals obtained by duplicating the modulation signal generated by the modulation unit, delays having lengths different from each other, a difference between the delays being an integral multiple of a reciprocal of a bandwidth of the modulation signal; and a plurality of transmission antennas that transmit the plurality of modulation signals, respectively, to which the delays are provided by the delay unit. The reception device includes: a reception antenna that receives the plurality of modulation signals transmitted from the plurality of transmission antennas of the transmission device to obtain a reception signal; a reception unit that performs a frequency conversion and an analog-digital conversion on the reception signal obtained by the reception antenna to generate a digital signal through the conversions; and a demodulation unit that demodulates the digital signal generated by the reception unit.

A transmission method according to a fifth aspect of the present invention is a transmission method performed by a transmission device, the method includes: a modulation step of performing chirp-spread modulation on an input information series to generate a modulation signal; a delay step of providing, to a plurality of modulation signals obtained by duplicating the modulation signal generated in the modulation step, delays having lengths different from each other, a difference between the delays being an integral multiple of a reciprocal of a bandwidth of the modulation signal; and a transmission step of transmitting the plurality of modulation signals, to which the delays are provided in the delay step, from a plurality of transmission antennas, respectively.

A transmission device according to a sixth aspect of the present invention includes: a modulation unit that performs spread modulation on an input information series to generate a modulation signal; a frequency offset-providing unit that provides, to a plurality of modulation signals obtained by duplicating the modulation signal generated by the modulation unit, frequency offsets different from each other, a difference between the frequency offsets being an integral multiple of a symbol rate; and a plurality of transmission antennas that transmit the plurality of modulation signals, respectively, to which the frequency offsets are provided by the frequency offset-providing unit.

According to a seventh aspect of the present invention, in the transmission device according to the sixth aspect, the frequency offset-providing unit includes: a local oscillator that generates a carrier signal for each of the plurality of modulation signals; a frequency converter that performs a frequency conversion on the modulation signals using the carrier signal; and a band-limiting filter that suppresses a carrier leak and an image leak generated through the frequency conversion.

According to an eighth aspect of the present invention, in the transmission device according to the sixth aspect, the frequency offset-providing unit includes: a local oscillator that generates a first carrier signal and a second carrier signal which have frequencies different from each other for each of the plurality of modulation signals; a first frequency converter that performs a frequency conversion on the modulation signal using the first carrier signal; a first band-limiting filter that suppresses a carrier leak and an image leak generated through the frequency conversion by the first frequency converter; a second frequency converter that performs a frequency conversion on a signal output from the first band-limiting filter by using the second carrier signal; and a second band-limiting filter that suppresses the carrier leak and the image leak generated through the frequency conversion by the second frequency converter.

According to a ninth aspect of the present invention, in the transmission device according to the sixth aspect, the frequency offset-providing unit includes: a variable-phase shifter that adaptively changes a phase of the modulation signal for each of the plurality of modulation signals; and a control unit that controls the variable-phase shifter.

According to a tenth aspect of the present invention, in the transmission device according to the ninth aspect, the frequency offset-providing unit further includes a variable attenuator that attenuates an amplitude of the modulation signal, in which a phase is changed by the variable-phase shifter according to the control of the control unit, for each of the plurality of modulation signals.

A wireless communication system according to an eleventh aspect of the present invention includes a transmission device and a reception device. The transmission device includes: a modulation unit that performs spread modulation on an input information series to generate a modulation signal; a frequency offset-providing unit that provides, to a plurality of modulation signals obtained by duplicating the modulation signal generated by the modulation unit, frequency offsets different from each other, a difference between the frequency offsets being an integral multiple of a symbol rate; and a plurality of transmission antennas that transmit the plurality of modulation signals, respectively, to which the frequency offsets are provided by the frequency offset-providing unit. The reception device includes: a reception antenna that receives the plurality of modulation signals transmitted from the plurality of transmission antennas of the transmission device to obtain a reception signal; a reception unit that performs a frequency conversion and an analog-digital conversion on the reception signal obtained by the reception antenna to generate a digital signal through the conversions; and a demodulation unit that demodulates the digital signal generated by the reception unit A transmission method according to a twelfth aspect of the present invention is a transmission method by a transmission device, the method including: a modulation step of performing spread modulation on an input information series to generate a modulation signal; a frequency offset-providing step of providing, to a plurality of modulation signals obtained by duplicating the modulation signal generated in the modulation step, frequency offsets different from each other, a difference between the frequency offsets being an integral multiple of a symbol rate; and a transmission step of transmitting the plurality of modulation signals, to which the frequency offsets are provided in the frequency offset-providing step, from a plurality of transmission antennas, respectively.

Advantageous Effects of Invention

According to the present invention, in a wireless communication system using spread modulation, appropriate frequency offsets or delays are provided. Therefore, it is possible to obtain a diversity effect without using an interleaver or an error correction code, that is, using a general reception device that is not supposed to apply frequency offset diversity.

DESCRIPTION OF EMBODIMENTS

A wireless communication system according to each embodiment which will be described below obtains a transmission diversity effect by performing transmission using a plurality of transmission antennas, and includes a transmission device and a reception device.

First Embodiment

Hereinafter, a first embodiment of the present invention will be described.

[Configuration of Transmission Device]

Hereinafter, a configuration of a transmission device 1 according to the first embodiment will be described with reference to the accompanying drawings.

Figure 1:
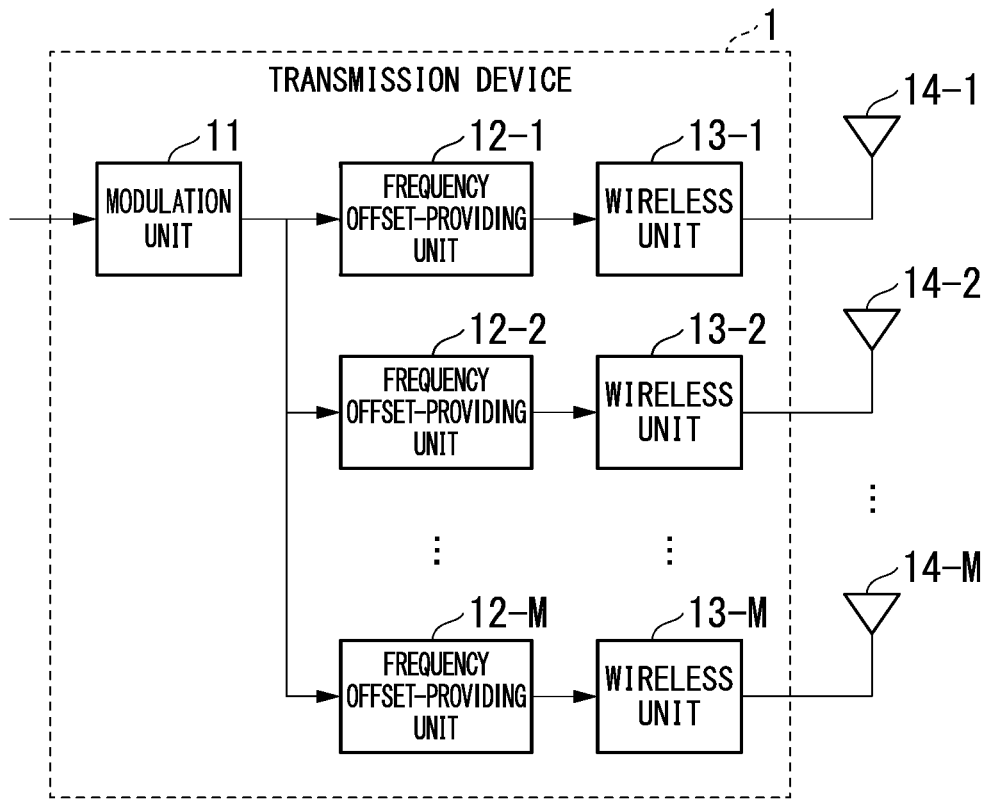
FIG. 1 is a block diagram representing a configuration of a transmission device according to a first embodiment.

FIG. 1 is a block diagram representing a configuration of the transmission device 1 according to the first embodiment of the present invention. As represented in FIG. 1, the transmission device 1 includes a modulation unit 11, M frequency offset-providing units 12 (12-1, 12-2, ..., 12-M), and M wireless units 13 (13-1, 13-2, ..., 13-M). In addition, the M wireless units 13 (wireless units 13-1 to 13-M) are connected to transmission antennas 14 (14-1, 14-2, ..., 14-M), respectively.

The modulation unit 11 performs spread modulation on an input information series S10. The modulation unit 11 outputs symbol series S11, which are symbol series obtained by performing the spread modulation on the information series S10, to each of the frequency offset-providing units 12 (12-1, 12-2, ..., 12-M). That is, the duplicated symbol series S11 are supplied to each of the frequency offset-providing units 12 (12-1, 12-2, ..., 12-M). The modulation unit 11 uses, as the spread modulation, any of direct spectrum spread using a spreading code, frequency hopping spectrum spread for switching a frequency, or chirp spectrum spread using a signal (for example, a sine wave signal) whose frequency changes linearly.

The frequency offset-providing units 12 (12-1, 12-2, ..., 12-M) acquires the symbol series S11 output from the modulation unit 11. Each of the frequency offset-providing units 12 (12-1, 12-2, ..., 12-M) provides frequency offsets to the acquired symbol series S11. The frequency offsets provided to the symbol series S11 by the respective frequency offset-providing units 12 are different from each other. In a case where frequency offsets are provided, the M symbol series S12 (S12-1, S12-2, ..., S12-M) are generated. The frequency offset-providing units 12 (12-1, 12-2, ..., 12-M) output the generated symbol series S12 (S12-1, S12-2, ..., S12-M) to the wireless units 13 (13-1, 13-2, ..., 13-M), respectively.

The wireless units 13 (13-1, 13-2, ..., 13-M) obtain the symbol series S12 (S12-1, S12-2, ..., S12-M), which are output from the frequency offset-providing units 12 (12-1, 12-2, ..., 12-M) and to which the frequency offsets are provided, respectively. The wireless units 13 (13-1, 13-2, ..., 13-M) perform an analog conversion and a frequency conversion on the obtained symbol series S12 (S12-1, S12-2, ..., S12-M). Therefore, the symbol series S12 (S12-1, S12-2, ..., S12-M) are converted into M transmission signals S13 (S13-1, S13-2, ..., S13-M), respectively.

The wireless units 13 (13-1, 13-2, ..., 13-M) transmit the transmission signals S13 (S13-1, S13-2, ..., S13-M) obtained through the conversions to a reception device 2, which will be described below, through the M transmission antennas 14 (14-1, 14-2, ..., 14-M).

[Configuration of Reception Device]

Hereinafter, a configuration of the reception device 2 will be described with reference to the accompanying drawings.

Figure 2:
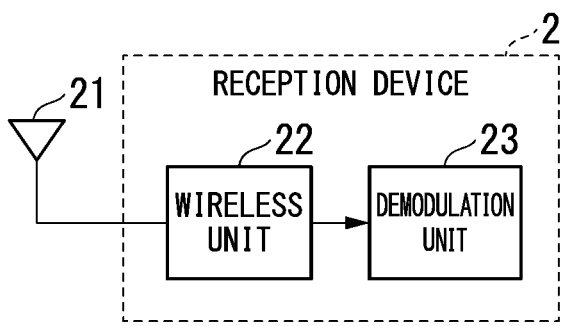
FIG. 2 is a block diagram representing a configuration of a general reception device in digital wireless communication.

FIG. 2 is a block diagram representing a configuration of the general reception device 2 in digital wireless communication. As represented in FIG. 2, the reception device 2 includes a wireless unit 22 and a demodulation unit 23. In addition, the wireless unit 22 is connected to a reception antenna 21.

The reception antenna 21 receives a wireless signal transmitted from the transmission device 1.

The wireless unit 22 (reception unit) performs the frequency conversion and a digital conversion on a reception signal S21 received through the reception antenna 21. The wireless unit 22 outputs a digital signal S22, which is obtained by performing the frequency conversion and an analog-digital conversion on the reception signal S21, to the demodulation unit 23.

The demodulation unit 23 demodulates the digital signal S22 output from the wireless unit 22 to convert the digital signal S22 into a signal series S23. In a case where demodulation is performed on the signal series S23, the demodulation unit 23 compensates for a frequency fluctuation, an amplitude fluctuation, and a phase fluctuation occurring in the wireless signal on a transmission path between each of the transmission antennas 14 and the reception antenna 21 through equalization with respect to the digital signal S22.

Hereinafter, an operation of the frequency offset-providing units 12, which are characteristic in the present invention, and a temporal fluctuation and a reception quality of the reception signal in a case of being received using the reception device 2 having a general configuration in the digital wireless communication will be described in detail using Expressions.

[Frequency Offset-Providing Operation]

Hereinafter, the operation of the frequency offset-providing units 12 (12-1, 12-2, ..., 12-M) will be described. The frequency offset-providing units 12 (12-1, 12-2, ..., 12-M) provide the frequency offsets to the symbol series S11 such that a difference between all the frequency offsets provided to the symbol series S11 becomes an integral multiple of a symbol rate fs. The symbol rate fs is a reciprocal of a time interval between adjacent symbols included in the symbol series S11.

Figure 3:
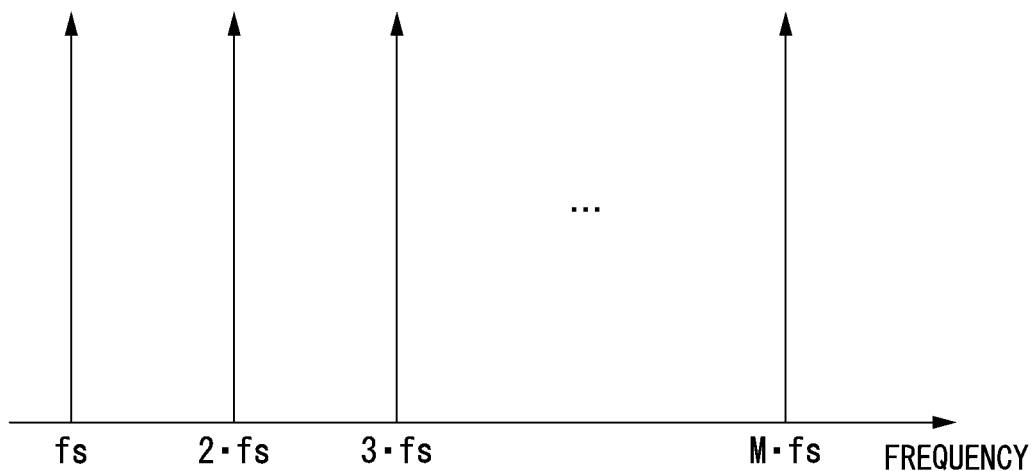
FIG. 3 is a diagram representing an example of a frequency offset interval provided by a frequency offset-providing unit according to the first embodiment.

FIG. 3 is a diagram representing intervals of the frequency offsets provided by the frequency offset-providing units 12 (12-1, 12-2, ..., 12-M). As represented in FIG. 3, for example, in a case where the frequency offsets are provided so as to be arranged at an equal interval of an interval fs and in a case where the symbol series S11 output from the modulation unit 11 is set to x(t) and a symbol series S12-$m$ output from a frequency offset-providing unit 12-$m$ ($m=1, 2, \ldots, M$) is set to $y_m(t)$, $y_m(t)$ is expressed by the following Expression (1). In Expression (1), j represents an imaginary unit.

[Math. 1]

$$y_m(t) = x(t) \cdot \exp(j \cdot 2\pi \cdot m \cdot f_s \cdot t) \quad (1)$$

Next, a temporal fluctuation of the reception signal S22, which is the reception signal output from the wireless unit 22, will be described. Here, in a case where a channel response between an m-th transmission antenna 14-$m$ and the reception antenna 21 is set to $h_m$ and the digital signal S22 output from the wireless unit 22 is set to z(t), z(t) is represented by the following Expression (2).

[Math. 2]

$$z(t) = \sum_{m=1}^{M} h_m \cdot y(t) = x(t) \cdot \sum_{m=1}^{M} h_m \cdot \exp(j \cdot 2\pi \cdot m \cdot f_s \cdot t) \quad (2)$$

However, since the symbol rate is generally small in the spread modulation, there are many cases where a phase and an amplitude fluctuate within one symbol according to movement of the transmission device 1 or the reception device 2, a fluctuation of surrounding environment, and the like. Therefore, in general, the demodulation unit 23 has an adaptive equalization function for compensating for the fluctuations of the phase and the amplitude within one symbol with respect to a wireless signal obtained by performing the spread modulation on the information series. In a case where the demodulation unit 23 has the adaptive equalization function, it is possible to estimate the reception quality using a reception level per symbol. In a case where an amplitude of a modulation signal x(t) is always fixed, a reception level $\alpha$ ($\Delta t$) per symbol at a time $\Delta t$ is expressed by the following Expression (3).

[Math. 3]

$$\alpha(\Delta t) = \int_{\Delta t}^{\Delta t + \frac{1}{f_s}} |z(t)|^2 \cdot dt \quad (3)$$

$$= \sum_{m=1}^{M} |h_m|^2 + 2 \cdot \sum_{m=1}^{M-1} \int_{\Delta t}^{\Delta t + \frac{1}{f_s}}$$

$$\mathrm{Re}\left[\left(\sum_{i=1}^{M-m} h_m \cdot h_{m+i}^*\right) \cdot \exp(j \cdot 2\pi \cdot i \cdot f_s \cdot t)\right] \cdot dt$$

$$= \sum_{m=1}^{M} |h_m|^2$$

As is clear from Expression (3), a value of the reception level $\alpha(\Delta t)$ is a value obtained by adding a square of an absolute value of each channel response between all the transmission antennas 14 and the reception antenna 21. The value is the same as a value as in a case where maximum ratio combination diversity reception is performed on a reception side. Accordingly, it is possible to obtain a transmission diversity effect by compensating for a fluctuation of one symbol period included in the channel response $\alpha$ ($\Delta t$) in Expression (3).

As described above, the demodulation unit 23 provided in the reception device 2 has the adaptive equalization function for compensating for fluctuations in each of the frequency, the amplitude, and the phase that occur in the wireless signal on the transmission path. With the adaptive equalization function, the demodulation unit 23 compensates for the above-described fluctuations included in the digital signal S22 and cancels the frequency offsets provided to the symbol series S11 in the transmission device 1. A reason for this is that the fluctuation of the frequency generated on the transmission path and the frequency offset provided in the transmission device 1 are treated similarly in the adaptive equalization. That is, it is possible for the reception device 2 of the wireless communication system to obtain the same transmission diversity effect as the maximum ratio combination diversity effect without including the deinterleaver or an error correction code decoder required in a transmission diversity method according to the related art. The demodulation unit 23 has a function which is a function also included in a general reception device. Accordingly, even in a case of a reception device which is not suitable for an existing transmission diversity method, it is possible to obtain a transmission diversity effect by using the transmission device 1.

[Operation of Transmission Device]

Hereinafter, an example of an operation of the transmission device 1 according to the first embodiment will be described with reference to the drawings.

Figure 4:
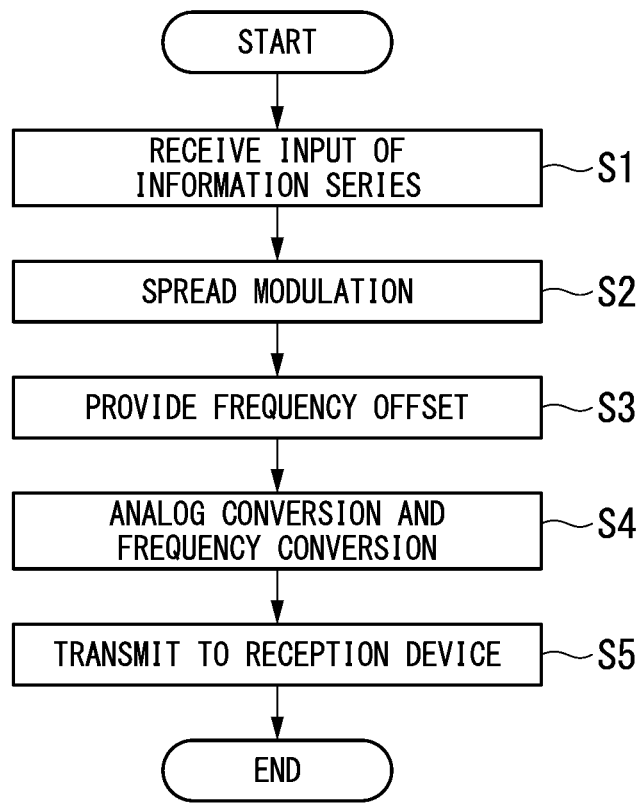
FIG. 4 is a flowchart representing an operation of the transmission device according to the first embodiment.

FIG. 4 is a flowchart representing the operation of the transmission device 1 according to the first embodiment of the present invention. This flowchart starts in a case where the information series S10 is input to the modulation unit 11.

The modulation unit 11 receives an input of the information series S10 (Step S1). The modulation unit 11 performs the spread modulation on the input information series S10 to generate the symbol series S11 (step S2).

The frequency offset-providing units 12 (12-1, 12-2, ..., 12-M) each provides the frequency offsets to the symbol series S11 on which the spread modulation is performed by the modulation unit 11 (step S3). As a result, the M symbol series S12 (S12-1, S12-2, ..., S12-M) are generated. The frequency offsets provided to the symbol series S11 by the frequency offset-providing units 12 are different from each other.

The wireless units 13 (13-1, 13-2, ..., 13-M) perform the analog conversion and the frequency conversion on the symbol series S12 (S12-1, S12-2, ..., S12-M), respectively, to which the frequency offsets are each provided (step S4). Accordingly, the symbol series S12 (S12-1, S12-2, ..., S12-M) are converted into M transmission signals S13 (S13-1, S13-2, ..., S13-M), respectively.

The wireless units 13 (13-1, 13-2, ..., 13-M) transmit the transmission signals S13 (S13-1, S13-2, ..., S13-M) obtained through the conversion to the reception device 2 through the M transmission antennas 14 (14-1, 14-2, ..., 14-M) (step S5), respectively.

Hereinabove, the process of the flowchart represented in FIG. 4 ends.

As described above, the transmission device 1 according to the first embodiment transmits the wireless signals, on which the spread modulation is performed, from the plurality of transmission antennas. The transmission device 1 includes the modulation unit 11 that performs the spread modulation on the input information series. In addition, the transmission device 1 includes the plurality of frequency offset-providing units 12 that provide, to respective M modulation signals obtained by duplicating the modulation signal generated by the modulation unit 11, the frequency offsets, a difference between all the frequency offsets provided to the modulation signals being an integral multiple of the symbol rate. In addition, the transmission device 1 includes the wireless units 13 that transmit the M modulation signals to which the frequency offsets are provided by the frequency offset-providing units 12 through the plurality of transmission antennas.

With the above configuration, the transmission device 1 according to the first embodiment transmits respective signals, to which a frequency difference having m phases (m=1, 2, ..., M) in one symbol is provided, from different antennas to generate a forced reception level fluctuation of one symbol period on the reception side. In a case where demodulation is performed on the reception signal using a multipath equalization function provided as a standard feature of a spread modulation wireless chip such as a Long Range (LoRa) (registered trademark) chip, it is possible to obtain the diversity effect without adding a special function.

As described above, in the wireless communication system using the spread modulation according to the first embodiment, appropriate frequency offsets are provided on the transmission side. Therefore, on the reception side, it is possible to obtain the diversity effect without using an interleaver or an error correction code that is, using a general reception device that does not assume application of the frequency offset diversity.

Second Embodiment

Hereinafter, a second embodiment of the present invention will be described.
[Configuration of Transmission Device]
Hereinafter, the configuration of a transmission device 3 according to the second embodiment will be described with reference to the drawings.

Figure 5:
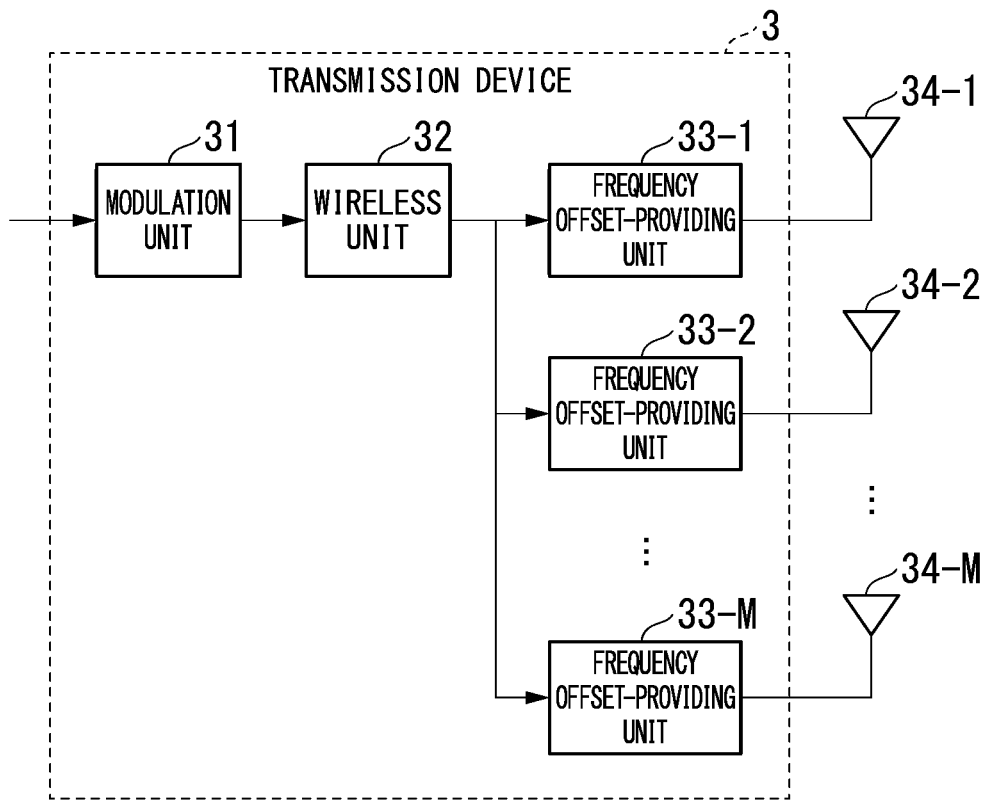
FIG. 5 is a block diagram representing a configuration of a transmission device according to a second embodiment.

FIG. 5 is a block diagram representing a configuration of the transmission device 3 according to the second embodiment of the present invention. As represented in FIG. 5, the transmission device 3 includes a modulation unit 31, a wireless unit 32, and M frequency offset-providing units 33 (33-1, 33-2, ..., 33-M). In addition, the frequency offset-providing units 33 (33-1, 33-2, ..., 33-M) are connected to M transmission antennas 34 (34-1, 34-2, ..., 34-M), respectively.

The modulation unit 31 performs spread modulation on input information series S30, similarly to the modulation unit 11. The modulation unit 31 outputs a symbol series S31, which is a symbol series obtained by performing spread modulation on the information series S30, to wireless unit 32.

The wireless unit 32 acquires the symbol series S31 output from the modulation unit 31. The wireless unit 32 performs the analog conversion and the frequency conversion on the acquired symbol series S31. The symbol series S31 is converted into analog signals S32 through the conversions. The wireless unit 32 outputs the analog signals S32, obtained through the conversions, to each of the frequency offset-providing units 33 (33-1, 33-2, ..., 33-M).

The frequency offset-providing units 33 (33-1, 33-2, ..., 33-M) each acquires the analog signals S32 output from the wireless unit 32. Each of frequency offset-providing units 33 (33-1, 33-2, ..., 33-M) provides frequency offsets to the obtained analog signals S32. The frequency offsets provided to the analog signals S32 by the frequency offset-providing units 33 are different from each other. In a case where the frequency offsets are provided, M transmission signals S33 (S33-1, S33-2, S33-M) are generated. The frequency offset-providing units 33 (33-1, 33-2, ..., 33-M) transmit the generated transmission signals S33 (S33-1, S33-2, S33-M) to the reception device 2 through the M transmission antennas 34 (34-1, 34-2, ..., 34-M), respectively.

The transmission device 1 according to the above-described first embodiment is configured to provide the frequency offsets to the digital signals indicating the symbol series S11. In contrast, the transmission device 3 according to the second embodiment is configured to provide the frequency offsets to the analog signals S32. With the configuration, it is possible to integrate the wireless units 32 into one unit. Accordingly, it is possible to reduce costs of the transmission device 3 according to the second embodiment compared with the transmission device 1 according to the first embodiment.

Note that, as means for providing the frequency offsets to the analog signals, there is means using a frequency converter or means using a variable-phase shifter. Hereinafter, a configuration of a frequency offset-providing unit using the frequency converter and a configuration of a frequency offset-providing unit using the variable-phase shifter will each be described with reference to the drawings.
[Configuration Example of Frequency Offset-Providing unit Using Frequency Converter]

Figure 6:
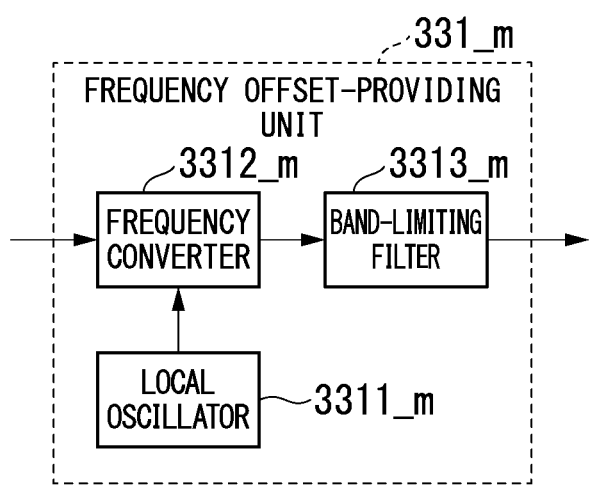
FIG. 6 is a block diagram representing a first configuration example of a frequency offset-providing unit using a frequency converter according to the second embodiment.
Figure 7:
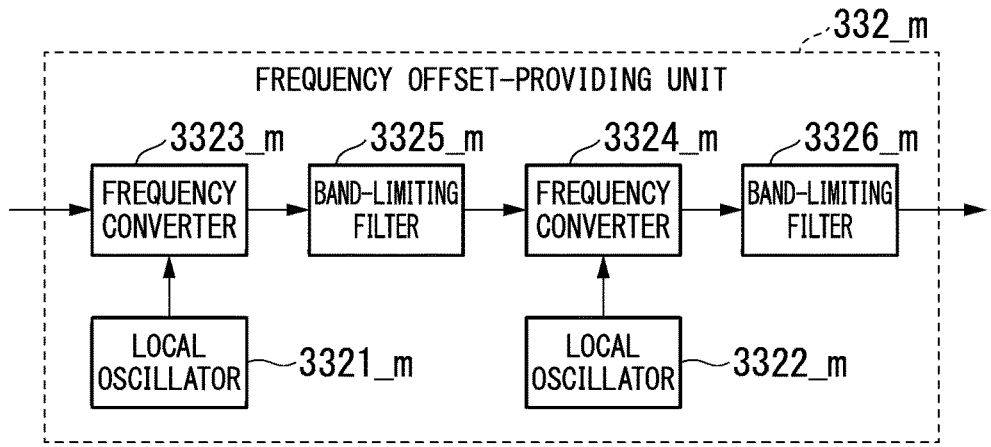
FIG. 7 is a block diagram representing a second configuration example of the frequency offset-providing unit using frequency converters according to the second embodiment.

FIG. 6 and FIG. 7 are block diagrams representing a frequency offset-providing unit 331_m and a frequency offset-providing unit 332_m, respectively, as first and second configuration examples of the frequency offset-providing unit using the frequency converter.

As represented in FIG. 6, the frequency offset-providing unit 331_m includes a local oscillator 3311_m, a frequency converter 3312_m, and a band-limiting filter 3313_m.

The local oscillator 3311_m generates a carrier signal of a frequency Δfc+m·fs. The local oscillator 3311_m outputs the generated carrier signal to the frequency converter 3312_m. Here, the frequency Δfc is a difference between a central frequency of an analog signal output from the wireless unit 32 and a central frequency of the transmission signal in a case where no frequency offset is applied.

The frequency converter 3312_m receives an input of the carrier signal output from the local oscillator 3311_m. The frequency converter 3312_m generates a signal offset by the frequency fc+m·fs by using the input carrier signal. The frequency converter 3312_m outputs the generated signal to the band-limiting filter 3313_m.

The band-limiting filter 3313_m receives the input of the signal output from frequency converter 3312_m. The band-limiting filter 3313_m suppresses a carrier leak (local leak) and an image leak (image signal), which are additionally generated due to the frequency conversion, from the input signal, and selectively passes a desired signal whose frequency is offset.

With the configuration, it is possible for the frequency offset-providing units 331_m to generate a signal to which the frequency offset is provided with respect to the analog signal S32.

However, in a case where Δfc is an abnormally small value or zero, a signal desired to be transmitted is abnormally close to a frequency of the local leak and the image signal which are additionally generated. Therefore, it is not possible for the band-limiting filter 3313_m in the frequency offset-providing unit 331_m to selectively pass only the signal desired to be transmitted. A configuration which enables the problem to be solved is the configuration of the frequency offset-providing unit 332_m represented in FIG. 7.

As represented in FIG. 7, the frequency offset-providing unit 332_m includes a local oscillator 3321_m, a local oscillator 3322_m, a frequency converter 3323_m, a frequency converter 3324_m, a band-limiting filter 3325_m, and a band-limiting filter 3326_m.

The local oscillator 3321_m and the local oscillator 3322_m generate carrier signals having a frequency Δfc+fi+m·fs and a frequency fi, respectively. That is, the local oscillator 3321_m and the local oscillator 3322_m each generates the carrier signals whose frequencies are slightly different from each other. Here, the frequency fi may be an arbitrary frequency, and the difference between the frequencies of the two carrier signals is (Δfc+m·fs). The local oscillator 3321_m and the local oscillator 3322_m output the generated carrier signals to the frequency converter 3323_m and the frequency converter 3324_m, respectively.

The frequency converter 3323_m and the frequency converter 3324_m receive inputs of the carrier signals output from the local oscillator 3321_m and the local oscillator 3322_m, respectively. The frequency converter 3323_m and the frequency converter 3324_m each performs the frequency conversion by using the input carrier signal. The frequency converter 3323_m and the frequency converter 3324_m output the generated signals to the band-limiting filter 3325_m and the band-limiting filter 3326_m, respectively.

The band-limiting filter 3325_m and the band-limiting filter 3326_m receive inputs of the signals output from the frequency converter 3323_m and the frequency converter 3324_m, respectively. The band-limiting filter 3325_m and the band-limiting filter 3326_m suppress the carrier leak (local leak) and the image leak (image signal), which are additionally generated due to the frequency conversion, from the input signals, and selectively pass a desired signal whose frequency is offset.

As described above, the frequency offset-providing unit 332_m once converts the frequency to a frequency higher than the transmission frequency, and then returns to the transmission frequency. With the two frequency conversions, the carrier leak or the image leak is expressed by a frequency apart from the central frequency of the analog signal S32. Therefore, according to frequency offset-providing unit 332_m, even in a case where Δfc is an abnormally small value or zero, it becomes easy to selectively pass only the signal desired to be transmitted by the band-limiting filter. Therefore, it is possible to suppress the local leak and the image signal which are additionally generated due to the frequency conversion.

[Configuration Example of Frequency Offset-Providing Unit Using Variable-Phase Shifter]

Figure 8:
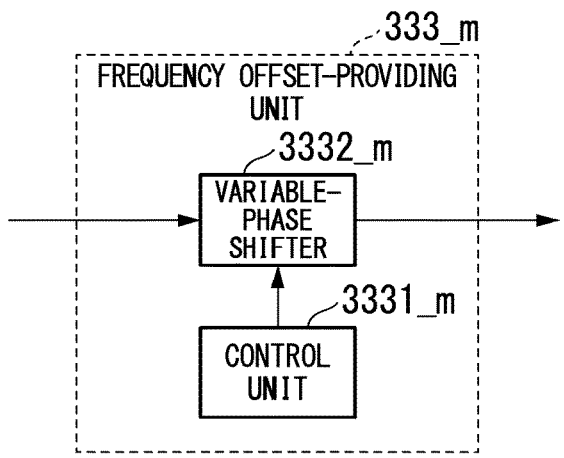
FIG. 8 is a block diagram representing a third configuration example of the frequency offset-providing unit using a variable-phase shifter according to the second embodiment.
Figure 9:
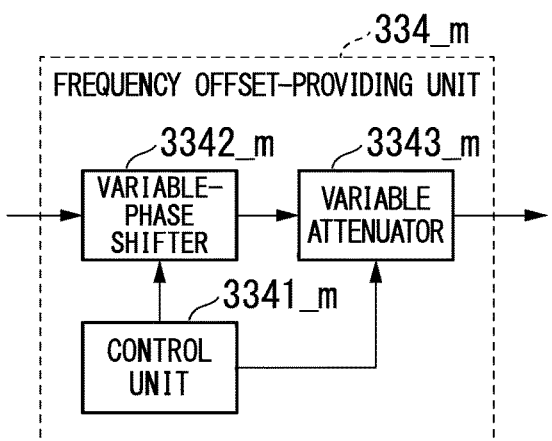
FIG. 9 is a block diagram representing a fourth configuration example of the frequency offset-providing unit using a variable-phase shifter according to the second embodiment.

FIG. 8 and FIG. 9 are block diagrams respectively representing a frequency offset-providing unit 333_m and a frequency offset-providing unit 334_m as third and fourth configuration examples of the frequency offset-providing unit using the variable-phase shifter.

As represented in FIG. 8, the frequency offset-providing unit 333_m includes a control unit 3331_m and a variable-phase shifter 3332_m.

The control unit 3331_m controls the variable-phase shifter 3332_m such that a phase linearly changes 360 degrees in 1/(m·fs) seconds. That is, the variable-phase shifter 3332_m adaptively changes the phase. In other words, the variable-phase shifter 3332_m provides a linear phase change of m×360 degrees per symbol to the analog signal S32 according to the control of the control unit 3331_m.

However, in the variable-phase shifter 3332_m, not only the phase but also the amplitude may change in a secondary manner. Accordingly, there is a possibility that deterioration occurs in signal quality as in a bandwidth of the transmission signal is enlarged due to amplitude fluctuation. A configuration in which it is possible to solve the problem is a configuration of the frequency offset-providing unit 334_m represented in FIG. 9.

As represented in FIG. 9, the frequency offset-providing unit 334_m includes a control unit 3341_m, a variable-phase shifter 3342_m, and a variable attenuator 3343_m. The control unit 3341_m controls an attenuation rate of the variable attenuator 3343_m based on a phase characteristic of the variable-phase shifter 3342_m. The phase characteristic is provided, for example, as a correspondence to a rate of increase/decrease of the phase and the amplitude provided by the variable-phase shifter 3342_m.

The control unit 3341_m determines the attenuation rate of the variable attenuator 3343_m based on the phase characteristic, and performs control to cancel the amplitude fluctuation of the variable-phase shifter 3342_m using the variable attenuator 3343_m. Accordingly, it is possible for the frequency offset-providing unit 334_m to avoid quality degradation of the transmission signal due to the amplitude fluctuation.

Third Embodiment

Hereinafter, a third embodiment of the present invention will be described.

[Configuration of Transmission Device]

Hereinafter, a configuration of a transmission device 4 according to a third embodiment will be described with reference to the drawings.

Figure 10:
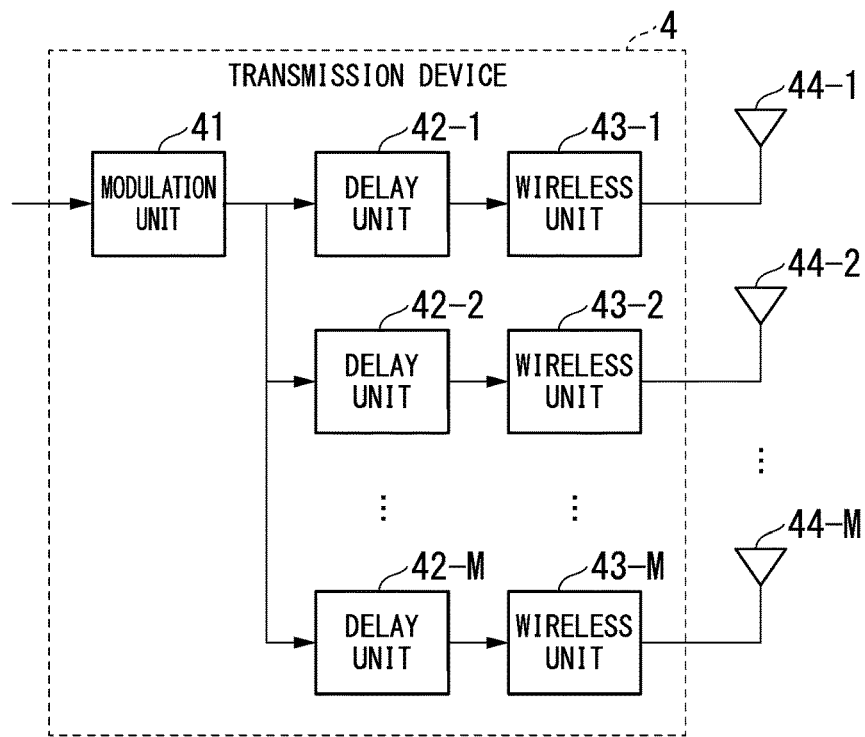
FIG. 10 is a block diagram representing a configuration of a transmission device according to a third embodiment.

FIG. 10 is a block diagram representing a configuration of the transmission device 4 according to the third embodiment of the present invention. As represented in FIG. 10, the transmission device 4 includes a modulation unit 41, M delay units 42 (42-1, 42-2, . . . , 42-M), and M wireless units 43 (43-1, 43-2, . . . , 43-M). In addition, the wireless units 43 (43-1, 43-2, . . . , 43-M) are respectively connected to M transmission antennas 44 (44-1, 44-2, . . . , 44-M).

The modulation unit 41 performs chirp-spread modulation on input information series S40. The modulation unit 11 outputs a symbol series S41, which is a symbol series obtained by performing spread modulation on the information series S40, to the delay units 42 (42-1, 42-2, . . . , 42-M).

Each of delay units 42 (42-1, 42-2, . . . , 42-M) obtains the symbol series S41 output from the modulation unit 41. The delay units 42 (42-1, 42-2, . . . , 42-M) provide time delays with respect to the acquired symbol series S41. The time delays provided to the symbol series S41 by the delay unit 42 are different from each other. In a case where the time delays are provided, the M symbol series S42 (S42-1, S42-2, S42-M) are generated. The delay units 42 (42-1, 42-2, . . . , 42-M) output the generated symbol series S42 (S42-1, S42-2, S42-M) to the wireless units 43 (43-1, 43-2, . . . , 43-M), respectively.

The wireless units 43 (43-1, 43-2, . . . , 43-M) acquire the symbol series S42 (S42-1, S42-2, S42-M), which are outputted from the delay units 42 (42-1, 42-2, . . . , 42-M), respectively. The wireless units 43 (43-1, 43-2, . . . , 43-M) perform the analog conversion and the frequency conversion on the acquired symbol series S42 (S42-1, S42-2, . . . , S42-M), respectively. Accordingly, the symbol series S42 (S42-1, S42-2, . . . , S42-M) is converted into transmission signals S43 (S43-1, S43-2, S43-M), respectively.

The wireless units 43 (43-1, 43-2, . . . , 43-M) transmit the transmission signals S43 (S43-1, S43-2, S43-M), which are acquired through the conversions, to the reception device 2 through the transmission antennas 44 (S44-1, S44-2, S44-M), respectively.

Note that, the delay units 42 (42-1, 42-2, . . . , 42-M) provide delays to the symbol series S41 such that a difference between all delay times provided to the symbol series S41 becomes an integral multiple of a reciprocal of a bandwidth of the modulation signal. Note that, lengths of the delays provided to the symbol series S41 by the delay units 42 are different from each other.

Note that, although there are various types of spread modulation, the chirp-spread modulation which causes the frequency to be changed linearly is one type of the spread modulation. In the chirp-spread modulation, the spread modulation is performed by sweeping a frequency of a signal linearly within one symbol. Therefore, in a case where the delay units 42 provide the delays to the symbol series S41, it is possible to obtain the same effect as a case where the frequency offsets are provided.

Figure 11:
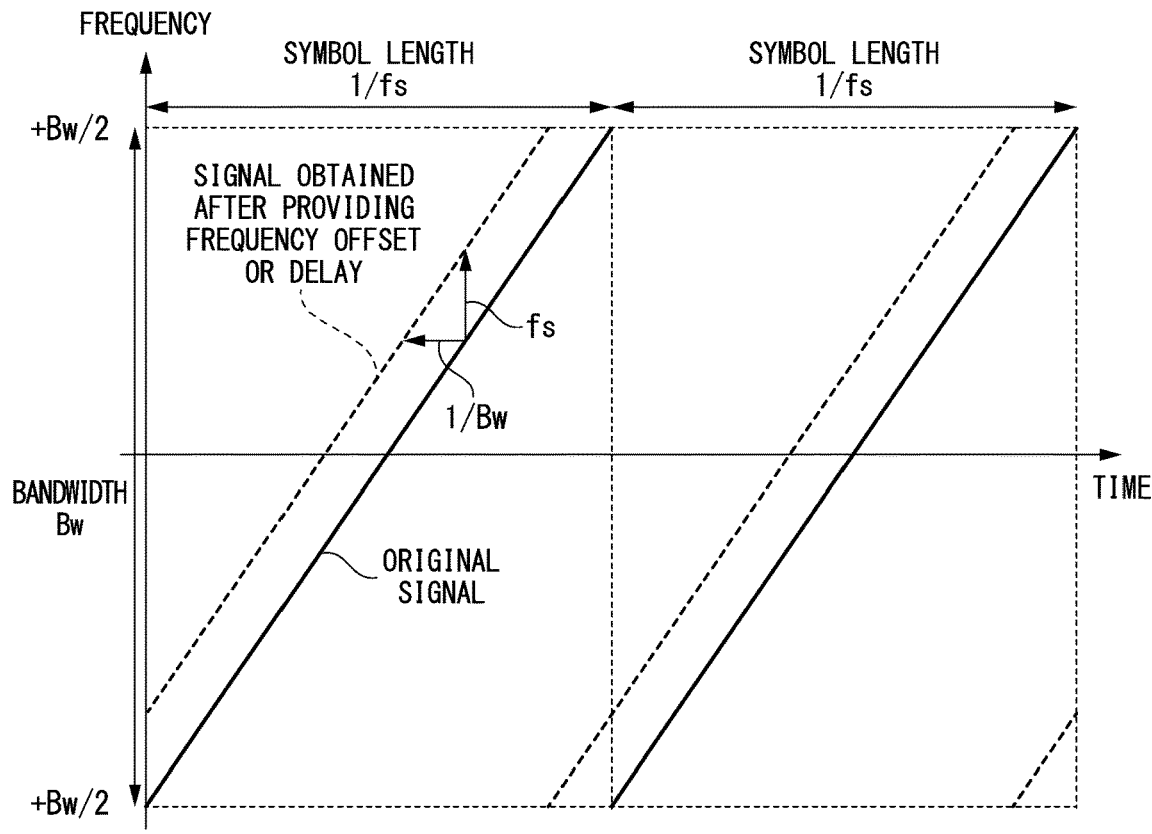
FIG. 11 is a diagram representing a relationship between a frequency and a time in chirp-spread modulation according to the third embodiment.

FIG. 11 is a diagram representing a relationship between the frequency and the time in the chirp-spread modulation. As is clear from FIG. 11, in a case where a modulation bandwidth of the symbol series S41 is set to Bw, a time delay of 1/Bw is equivalent to a frequency offset of fs. The transmission device 4 according to the third embodiment utilizes a characteristic of the chirp-spread modulation to realize the same effect as in a case where the frequency offset is provided by providing the time delay without providing the frequency offset.

As described above, the transmission device 4 according to the third embodiment is, for example, a transmission device that transmits a wireless signal on which the chirp-spread modulation, in which the frequency changes linearly with the time, is performed. The transmission device 4 includes a modulation unit 41 that performs spread modulation on an input information series. In addition, the transmission device 4 includes a plurality of delay units 42 that each provides delays with respect to the M modulation signals obtained by splitting the modulation signal generated by the modulation unit 41, such that a difference between all the delay times provided to the modulation signal becomes an integral multiple of the reciprocal of the bandwidth of the modulation signal. In addition, the transmission device 4 includes wireless units 43 that transmit the M modulation signals, to which the delays are provided by the delay units 42, through a plurality of transmission antennas.

As described above, according to the wireless communication system using the spread modulation according to the third embodiment, appropriate delays are provided on a transmission side. Therefore, it is possible to obtain diversity effect without using an interleaver or an error correction code on the reception side, that is, using a general reception device that does not assume application of frequency offset diversity.

Fourth Embodiment

Hereinafter, a fourth embodiment of the present invention will be described.

[Configuration of Transmission Device]

Hereinafter, a configuration of a transmission device 5 according to the fourth embodiment will be described with reference to the drawings.

Figure 12:
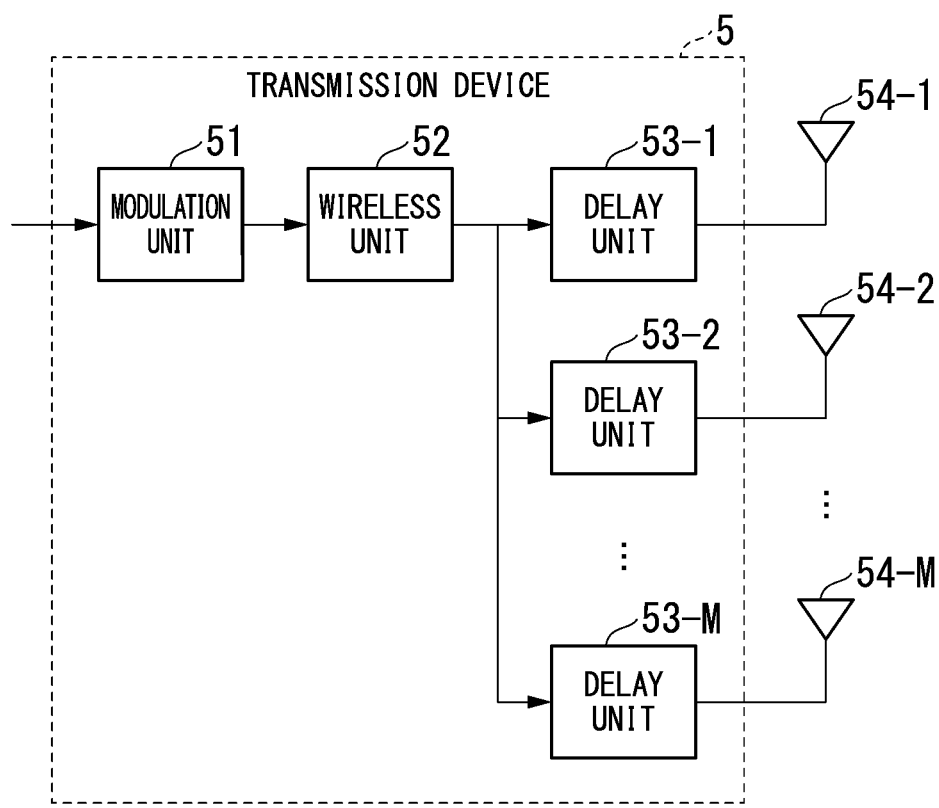
FIG. 12 is a block diagram representing a configuration of a transmission device according to a fourth embodiment.
Figure 13:
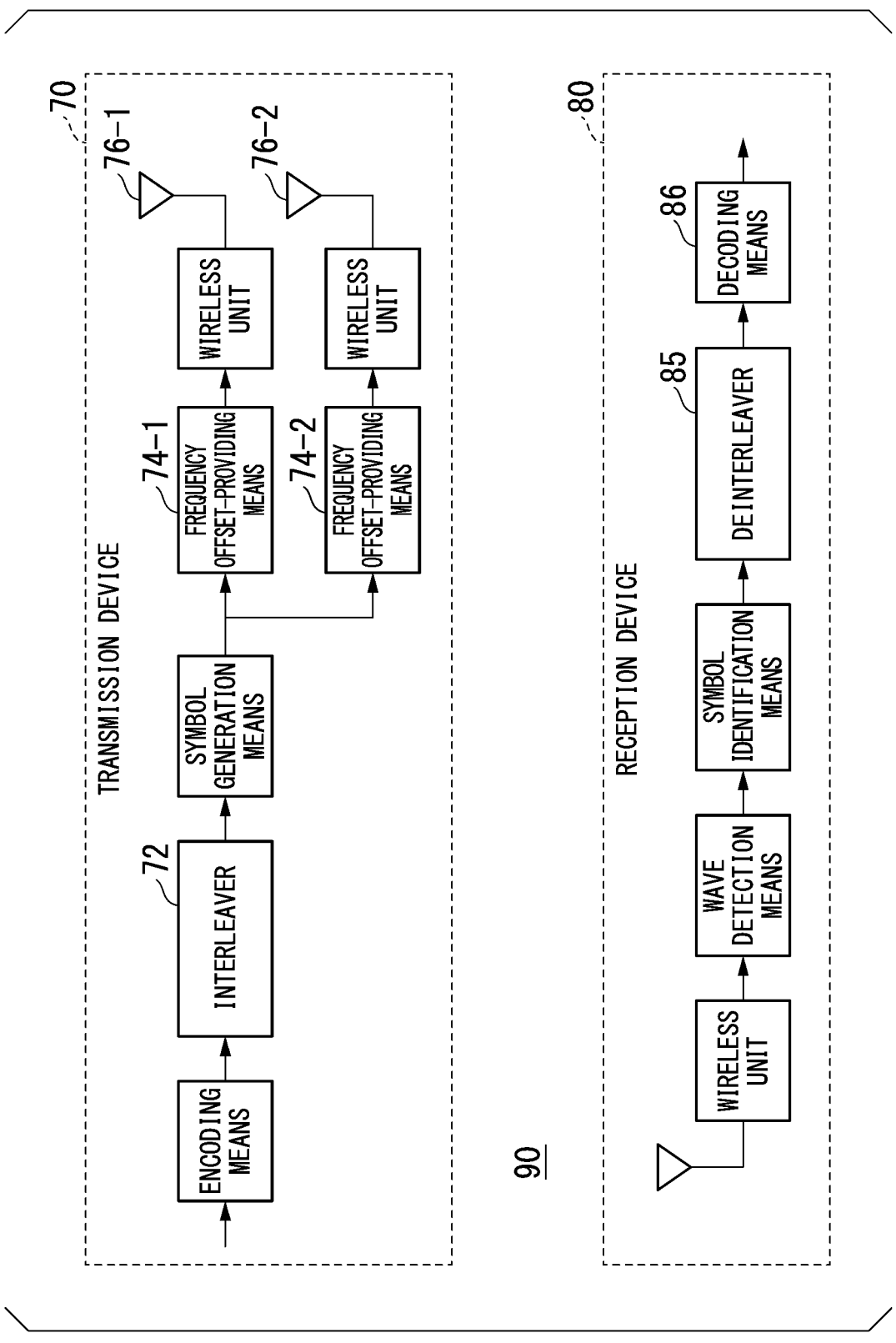
FIG. 13 is a block diagram representing a configuration of a wireless communication system disclosed in Patent Literature 1.

FIG. 12 is a block diagram representing a configuration of the transmission device 5 according to the fourth embodiment of the present invention. As represented in FIG. 12, the transmission device 5 includes a modulation unit 51, a wireless unit 52, and M delay units 53 (53-1, 53-2, . . . , 53-M). The delay units 53 (53-1, 53-2, . . . , 53-M) are connected to the M transmission antennas 54 (54-1, 54-2, . . . , 54-M), respectively.

The modulation unit 51 performs the chirp-spread modulation on input information series S50. The modulation unit 51 outputs a symbol series S51, which is a symbol series obtained by performing the spread modulation on the information series S50, to the wireless unit 52.

The wireless unit 52 acquires the symbol series S51 output from the modulation unit 51. The wireless unit 52 performs the analog conversion and the frequency conversion on the acquired symbol series S51. Accordingly, the symbol series S51 is converted into analog signals S52. The wireless unit 52 outputs the analog signals S52 obtained through the conversions to each of the delay units 53 (53-1, 53-2, . . . , 53-M).

Each of delay units 53 (53-1, 53-2, . . . , 53-M) acquires the analog signals S52 output from the wireless unit 52. Each of delay units 53 (53-1, 53-2, . . . , 53-M) provides delays to the obtained analog signals S52. The delays provided to the analog signals S52 by the delay units 53 are different from each other. In a case where the delays are provided, M transmission signals S53 (S53-1, S53-2, . . . , S53-M) are generated. The delay units 53 (53-1, 53-2, . . . , 53-M) transmit the generated transmission signals S53 (S53-1, S53-2, . . . , S53-M) to the reception device 2 through the M transmission antennas 54 (54-1, 54-2, . . . , 54-M).

Note that, the delay units 53 (53-1, 53-2, . . . , 53-M) provide delays to the analog signals S52 such that a difference between all delay times provided to the analog signals S52 becomes an integral multiple of a reciprocal of a bandwidth of the modulation signal.

The transmission device 4 according to the above-described third embodiment is configured to provide the time delays to the digital signals indicating the symbol series S41. In contrast, the transmission device 5 according to the fourth embodiment is configured to provide the time delays to the analog signals S52. With the configuration, it is possible to integrate the wireless units 52 into one unit. Accordingly, it is possible to reduce costs of the transmission device 5 according to the fourth embodiment compared with the transmission device 4 according to the third embodiment.

As described above, in a related art, in the wireless communication system using the spread modulation, it is necessary to add a deinterleaver and error correction code-decoding means to the reception device in a wireless communication system that relieves a random error using an error correction code. Therefore, in the wireless communication system according to the related art, there is a problem in that a special reception device that assumes application of transmission diversity needs to be used. The special reception device is, for example, a reception device including one or both of the deinterleaver and the error correction code-decoding means.

On the other hand, in the wireless communication system according to the embodiments of the present invention, the frequency offsets are appropriately provided or the delays are appropriately provided to signals to be transmitted as in a multipath in which a diversity gain is obtained. Specifically, in the wireless communication system according to the embodiments of the present invention, the frequency offsets are provided or the reciprocal of the modulation bandwidth is provided so as to be arranged at an equal interval "fs" obtained as the reciprocal of the symbol interval in the transmission device, and the fluctuation of the reception level in one symbol period is compensated for in the reception device. Since the signals, to which the above-described frequency offsets or the delays are provided, are orthogonal to each other, it is possible to compensate for fluctuation of the reception level without causing interference to occur between the signals.

Therefore, according to the present invention, it is possible to obtain a transmission diversity effect by using a general reception device, which does not assume the application of the frequency offset diversity, without using the interleaver or the error correction code.

Note that, although the configuration in which the reception device 2 includes one reception antenna 21 is described in the embodiment, the configuration is not limited thereto. The reception device 2 may include two or more reception antennas 21. In a case where the reception device 2 includes a plurality of reception antennas 21, the reception device 2 may receive signals transmitted from the transmission device 1 by applying a well-known reception diversity method.

In addition, although the configuration in which the transmission device includes the plurality of delay units is described in the embodiments, the configuration is not limited thereto. The transmission device may include one delay unit that provides different delays to a plurality of symbol series or analog signals. Similarly, the transmission device may include one frequency offset-providing unit that provides different frequency offsets to a plurality of symbol series or analog signals, instead of the plurality of frequency offset-providing units.

Note that, some or all of the transmission device of the above-described embodiments may be realized by a computer. In this case, an operation of each function may be realized by recording a program for realizing the control function on a computer-readable recording medium, causing a computer system to read a program recorded on the recording medium, and causing a processor to execute the program.

Note that, here, the "computer system" is a computer system built in the transmission device, and includes hardware such as an OS and peripheral devices. In addition, a "non-transitory computer-readable recording medium" refers to a portable medium such as a flexible disk, a magneto-optical disk, a ROM, and a CD-ROM, and a storage device such as a hard disk built in a computer system.

Further, a "computer-readable recording medium" may include a medium which dynamically holds a program for a short time, such as a communication line in a case where a program is transmitted through a network such as the Internet or a communication line such as a telephone line, and a medium which holds a program for a certain period of time as in a volatile memory in a computer system serving as a server or a client in the above case. In addition, the program may be a program for realizing some of the above-described functions, and, further, may be a program capable of realizing the above-described functions in combination with a program already recorded in a computer system.

In addition, some or all of the transmission device of the above-described embodiment may be realized as an integrated circuit such as a Large-Scale Integration (LSI) circuit. Each functional block of the transmission device may be individually formed as a processor or may be formed as a processor by integrating some or all of the functional blocks. In addition, a method of forming an integrated circuit is not limited to the LSI, and may be realized by a dedicated circuit or a general-purpose processor. Further, in the case where a technology for forming the integrated circuit that replaces the LSI appears with the progress of semiconductor technology, an integrated circuit based on the technology may be used.

INDUSTRIAL APPLICABILITY

In the present invention, it is possible to obtain a transmission diversity effect even in wireless communication with respect to a general reception device, thereby being applied to various types of wireless communication.

REFERENCE SIGNS LIST

1: Transmission device
2: Reception device
3: Transmission device
4: Transmission device
5: Transmission device
11: Modulation unit
12: Frequency offset-providing unit
13: Wireless unit
14: Transmission antenna 21: Reception antenna
22: Wireless unit
23: Demodulation unit
31: Modulation unit
32: Wireless unit
33: Frequency offset-providing unit
34: Transmission antenna
331_$m$: frequency offset-providing unit
3311_$m$: Local oscillator
3312_$m$: Frequency converter
3313_$m$: Band-limiting filter
332_$m$: Frequency offset-providing unit
3321_$m$: Local oscillator
3322_$m$: Local oscillator
3323_$m$: Frequency converter
3324_$m$: Frequency converter
3325_$m$: Band-limiting filter
3326_$m$: Band-limiting filter
333_$m$: Frequency offset-providing unit
3331_$m$: Control unit
3332_$m$: Variable-phase shifter
334_$m$: Frequency offset-providing unit
3341_$m$: Control unit
3342_$m$: Variable-phase shifter
3343_$m$: Variable attenuator
41: Modulation unit
42: Delay unit
43: Wireless unit
44: Transmission antenna
51: Modulation unit
52: Wireless unit
53: Delay unit
54: Transmission antenna

The invention claimed is:

1. A transmission device, comprising:
a modulation unit that performs chirp-spread modulation on an input information series to generate a modulation signal;
a delay unit that provides, to a plurality of modulation signals obtained by duplicating the modulation signal generated by the modulation unit, delays having lengths different from each other, a difference between the delays being an integral multiple of a reciprocal of a bandwidth of the modulation signal; and
a plurality of transmission antennas that transmit the plurality of modulation signals, respectively, to which the delays are provided by the delay unit.

2. The transmission device according to claim 1, wherein the delay unit provides the delays to digital signals representing the plurality of modulation signals.

3. The transmission device according to claim 1, wherein the delay unit provides the delays to analog signals representing the plurality of modulation signals.

4. A wireless communication system, comprising:
a transmission device; and
a reception device,
wherein the transmission device comprises:
a modulation unit that performs chirp-spread modulation on an input information series to generate a modulation signal;
a delay unit that provides, to a plurality of modulation signals obtained by duplicating the modulation signal generated by the modulation unit, delays having lengths different from each other, a difference between the delays being an integral multiple of a reciprocal of a bandwidth of the modulation signal; and
a plurality of transmission antennas that each transmits the plurality of modulation signals to which the delays are provided by the delay unit, and
wherein the reception device comprises:
a reception antenna that receives the plurality of modulation signals transmitted from the plurality of transmission antennas of the transmission device to obtain a reception signal;
a reception unit that performs a frequency conversion and an analog-digital conversion on the reception signal obtained by the reception antenna to generate a digital signal through the conversions; and
a demodulation unit that demodulates the digital signal generated by the reception unit.

5. A transmission method by a transmission device, the method comprising:
a modulation step of performing chirp-spread modulation on an input information series to generate a modulation signal;
a delay step of providing, to a plurality of modulation signals obtained by duplicating the modulation signal generated in the modulation step, delays having lengths different from each other, a difference between the delays being an integral multiple of a reciprocal of a bandwidth of the modulation signal; and
a transmission step of transmitting the plurality of modulation signals, to which the delays are provided in the delay step, from a plurality of transmission antennas, respectively.

6. A transmission device, comprising:
a modulation unit that performs spread modulation on an input information series to generate a modulation signal;
a frequency offset-providing unit that provides, to a plurality of modulation signals obtained by duplicating the modulation signal generated by the modulation unit, frequency offsets different from each other, a difference between the frequency offsets being an integral multiple of a symbol rate; and
a plurality of transmission antennas that transmit the plurality of modulation signals, respectively, to which the frequency offsets are provided by the frequency offset-providing unit.

7. The transmission device according to claim 6, wherein the frequency offset-providing unit comprises:
a local oscillator that generates a carrier signal for each of the plurality of modulation signals;
a frequency converter that performs a frequency conversion on the modulation signals using the carrier signal; and
a band-limiting filter that suppresses a carrier leak and an image leak generated through the frequency conversion.

8. The transmission device according to claim 6, wherein the frequency offset-providing unit comprises:
a local oscillator that generates a first carrier signal and a second carrier signal which have frequencies different from each other for each of the plurality of modulation signals,
a first frequency converter that performs a frequency conversion on the modulation signal using the first carrier signal,
a first band-limiting filter that suppresses a carrier leak and an image leak generated through the frequency conversion by the first frequency converter, a second frequency converter that performs a frequency conversion on a signal output from the first band-limiting filter by using the second carrier signal, and a second band-limiting filter that suppresses the carrier leak and the image leak generated through the frequency conversion by the second frequency converter.

9. The transmission device according to claim 6, wherein the frequency offset-providing unit comprises:

a variable-phase shifter that adaptively changes a phase of the modulation signal for each of the plurality of modulation signals, and a control unit that controls the variable-phase shifter.

10. The transmission device according to claim 9, wherein the frequency offset-providing unit further comprises:

a variable attenuator that attenuates an amplitude of the modulation signal, in which a phase is changed by the variable-phase shifter according to the control of the control unit, for each of the plurality of modulation signals.

11. A wireless communication system, comprising:
a transmission device; and
a reception device,
wherein the transmission device comprises:

a modulation unit that performs spread modulation on an input information series to generate a modulation signal;

a frequency offset-providing unit that provides, to a plurality of modulation signals obtained by duplicating the modulation signal generated by the modulation unit, frequency offsets different from each other, a difference between the frequency offsets being an integral multiple of a symbol rate; and a plurality of transmission antennas that transmit the plurality of modulation signals, respectively, to which the frequency offsets are provided by the frequency offset-providing unit, and wherein the reception device comprises:

a reception antenna that receives the plurality of modulation signals transmitted from the plurality of transmission antennas of the transmission device to obtain a reception signal, a reception unit that performs a frequency conversion and an analog-digital conversion on the reception signal obtained by the reception antenna to generate a digital signal through the conversions, and a demodulation unit that demodulates the digital signal generated by the reception unit.

12. A transmission method by a transmission device, the method comprising:

a modulation step of performing spread modulation on an input information series to generate a modulation signal;

a frequency offset-providing step of providing, to a plurality of modulation signals obtained by duplicating the modulation signal generated in the modulation step, frequency offsets different from each other, a difference between the frequency offsets being an integral multiple of a symbol rate; and a transmission step of transmitting the plurality of modulation signals, to which the frequency offsets are provided in the frequency offset-providing step, from a plurality of transmission antennas, respectively.

* * * * *